United States Patent Office

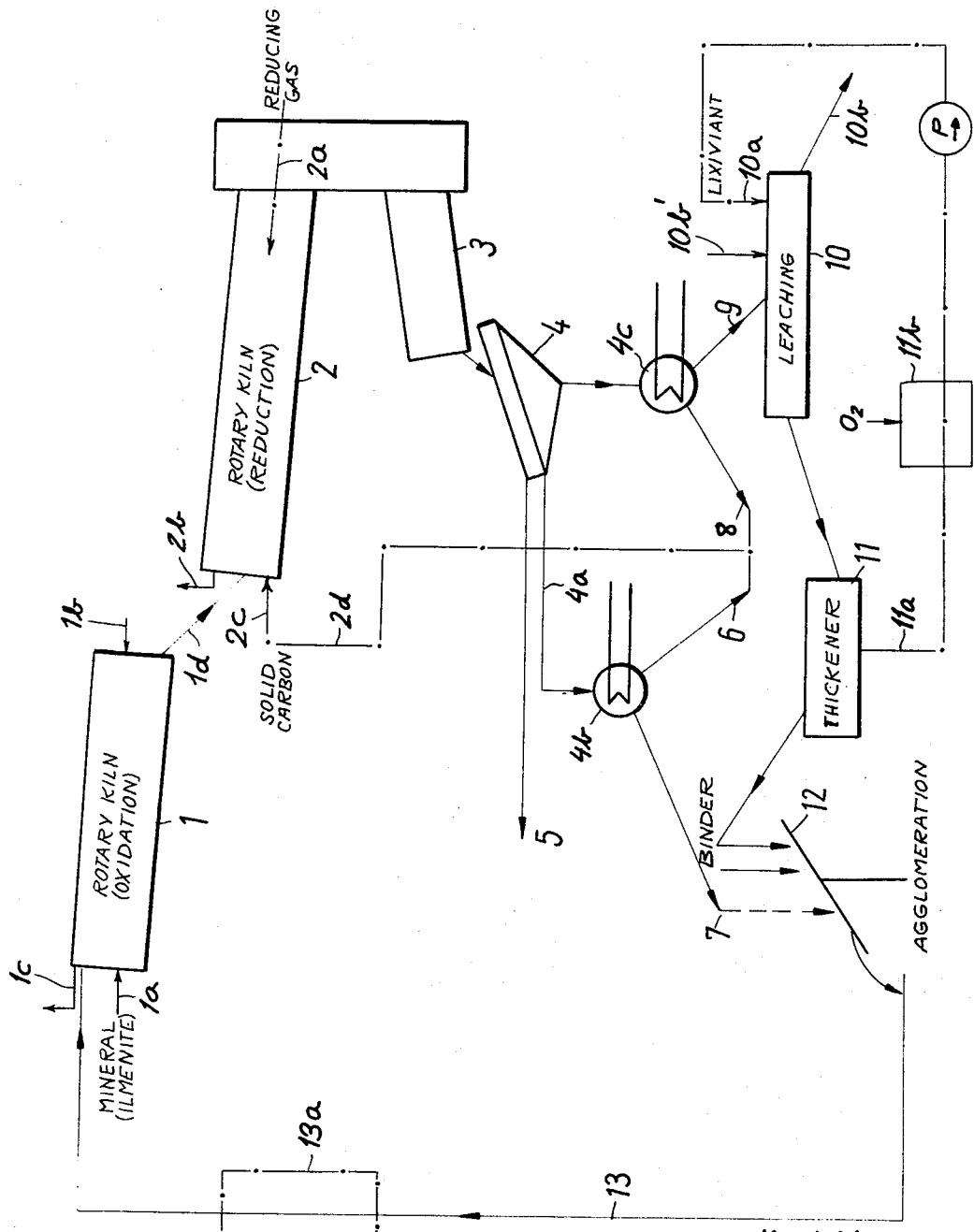

3,684,485
Patented Aug. 15, 1972

3,684,485
PROCESS FOR TREATING MINERALS CONTAINING THE FeO GROUP
Kurt Meyer, Gerhard Reuter, and Wilhelm Thumm, Frankfurt am Main, Germany, assignors to Metallgesellschaft Aktiengesellschaft, Frankfurt am Main, Germany
Filed Feb. 16, 1971, Ser. No. 115,371
Claims priority, application Germany, Feb. 26, 1970, P 20 08 896.4
Int. Cl. C21b *13/00, 1/06, 53/00*
U.S. Cl. 75—33    17 Claims

ABSTRACT OF THE DISCLOSURE

A process for treating a mineral, e.g. ilmenite, containing FeO groups together with a heavy-metal oxide (e.g. $TiO_2$) wherein the mineral is subjected to a reduction step to transform the iron oxide to metallic iron which is then leached. From the lixiviant, iron oxides and/ or hydroxides are precipitated. The precipitate is agglomerated, e.g. into briquettes with a binder, the agglomerate being recycled to the reducing stage to produce sponge iron. The mineral, after leaching, consists of a residue of the heavy-metal oxide of high purity.

FIELD OF THE INVENTION

Our present invention relates to a process for treating minerals containing the FeO group and, more particularly, minerals which contain heavy-metal oxides, especially titanium oxide, in addition to oxidic iron.

BACKGROUND OF THE INVENTION

It has been proposed to process minerals containing oxidic iron, i.e. ores which, in their molecular structure, contain FeO groups, by comminuting the mineral, roasting the comminuted products to transform FeO to $Fe_2O_3$ while producing a calcine or clinker and then reducing the calcine under atmospheric pressure at least to $Fe_3O_4$. The iron may then be leached from the mineral under atmospheric pressure without mechanically comminuting it and without the supply of heat.

It has also been suggested especially in the processing of ilmenite which contains titanium dioxide in addition to FeO, to leach the ore with sulfuric acid or hydrochloric acid, or to solubilize the ore under reducing conditions to form two distinct molten phases. A third technique is the treatment of the mineral with elemental chlorine and reducing agents to transform the iron component into volatile iron chlorides.

More recently, it has been suggested to reduce the iron oxide of the mineral selectively to metallic iron which is then leached from the mineral to leave a residue of titanium dioxide and produce a lixiviant which contains the iron.

All of the foregoing processes have, however, the disadvantage that high-purity heavy-metal oxides are not always obtained and that the reduction step is relatively inefficient. As a consequence, processes of the latter type have not only limited economical value.

OBJECTS OF THE INVENTION

It is, therefore, the principal object of the present invention to provide an improved process for treating ores containing heavy-metal oxides in addition to oxidic iron.

It is another object of this invention to provide a method of recovering iron in an economically significant and valuable form from minerals containing oxidic iron.

It is also an object of the invention to provide improved process for recovering high-purity titanium dioxide or other heavy-metal oxides from minerals containing same in conjunction with oxidic iron.

Also, it is an object of our invention to provide a process for treating minerals containing heavy-metal oxides together with iron oxide which enables, in a simple and economical manner, a recovery not only of the heavy-metal oxide in a high-purity state, especially titanium dioxide, but also of the iron content in a valuable form and capable of easy processing.

SUMMARY OF THE INVENTION

The above and other objects, which will become apparent hereinafter, are attained in accordance with the present invention with a process for or method of treating mineral substances containing the FeO group and especially minerals containing heavy-metal oxides in conjunction with the FeO group, in which the mineral is reduced selectively to transform the oxidic iron into metallic or elemental iron which is leached from the mineral after reduction. According to the invention, the iron is precipitated from the lixiviant in the form of iron oxide or iron hydroxide (oxidic or hydroxidic iron) and the precipitate is agglomerated to form pellets or briquettes which may be reduced simultaneously with reduction of the mineral to provide sponge iron. The mineral to be leached is mechanically separated from the agglomerated material after reduction so that the latter is recovered as iron sponge in a useful form while the residue from the leaching step consists of high-purity heavy metal oxide as will be apparent hereinafter.

Hence, the method of the present invention comprises the steps of:

(a) reducing iron oxides in the mineral to metallic iron;

(b) leaching the metallic iron produced in step (a) from the mineral with a lixiviant;

(c) precipitating oxidic or hydroxidic iron compounds from the lixiviant of step (b);

(d) agglomerating the precipitate produced in step (c); and (e) recycling the agglomerate of step (d) to step (a) for reduction of the agglomerate simultaneously with, in the presence of, and in admixture with the mineral whose oxidic iron content is selectively reduced, thereby producing sponge iron in agglomerate form. In addition, the method may include the step of recovering from step (b), upon leaching of the metallic iron from the mineral, the heavy-metal oxide in high purity.

Upon reducing the iron oxide of the mineral selectively to metallic iron, the reduction product is treated with the leaching agent from which predominantly trivalent iron is precipitated as an oxide or hydroxidic compound. The leaching agent itself is regenerated by treatment with oxygen-containing gases and oxidic or hydroxidic iron compounds are collected on the one hand while, on the other hand, the valuable heavy-metal oxides are recovered, these oxides having been left substantially unaltered by the treatment. The iron recovered from the lixiviant is reduced to form sponge iron by recycling of the agglomerated iron compound to the stage in which the iron oxide contained in the starting material is reduced to metallic iron. The agglomerate is in the form of briquettes or pellets according to another feature of this invention.

While we have found that the method described above is particularly adapted to the processing of titanium dioxide minerals, especially ilmenite, the method has also been found to be applicable to ores in which the heavy metal is chromium, manganese or vanadium, individually or collectively, or in combination with titanium, provided that the mineral also contains oxidic iron.

According to a more specific feature of this invention, the iron component, which has been precipitated and agglomerated, is dried before being subjected to reduction, the drying preferably being controlled to result in the formation of iron oxide. In other words, the drying temperature and duration and other operating parameters are so selected as to be sufficient to transform any iron hydroxides in the agglomerate into iron oxide. It has also been found to be advantageous to increase the green strength of the agglomerate by adding to the mixture or slurry to be briquetted or pelletized, a binder such as bentonite.

It has also been found to be advantageous, in some cases, to subject the mineral to artificial "weathering" or oxidation in order to increase the efficiency of the selective reduction. In this case, the mineral, prior to reduction, is fired in an oxygen-containing atmosphere. It is desirable, when this step is included, to combine the mineral with the agglomerated precipitated iron compounds prior to firing. The two components are then subjected simultaneously to reduction in the next stage.

The reduction step is carried out in accordance with conventional principles as described generally above. Preferably, the iron is reduced with the aid of gaseous, liquid or solid reducing agents to metallic iron at temperatures of 700°–1300° C. in a period of 20 to 140 minutes in a rotary kiln or a shaft furnace. For artificial weathering, according to the invention, the mixture of agglomerated oxidic or hydroxidic iron and the starting mineral is treated with oxygen-containing gases at a temperature of 750° C. to 1250° C. over a period of 20 to 150 minutes in a shaft furnace or a rotary kiln. The pretreatment has been found to be advantageous since it renders the iron component of the ilmenite, which generally is present in a divalent and trivalent form and is difficult to reduce, substantially completely susceptible to reduction in the subsequent stage.

When the material has been treated as described herein earlier and has been cooled to avoid reoxidation, the material is subject to leaching with a lixiviant in a leaching device, the lixiviant or leaching agent being capable of dissolving metallic iron. The active substance of the leaching agent may be a complex-forming compound, such as ethylenediaminetetraacetic acid, a salt thereof or ammoniated (ammonia containing) ammonium carbonate solution. A particularly desirable leaching agent is a solution which contains a ferric salt, preferably ferric chloride or ferric sulfate, with 15 to 65 g./liter of iron (total, calculated as Fe). Advantageously, the iron is present in both the divalent and higher-valent forms so that the ratio of divalent to trivalent iron is between 30:0.5 and 30:3. Where the leaching agent contains ferric salts, the leaching process results in a reaction of ferric ion with metallic iron to form the ferrous ion in accordance with the relationship: $2Fe^{+3} + Fe \rightarrow 3Fe^{+2}$.

Oxygen-containing gases are supplied to precipitate dissolved iron as oxidic or hydroxidic iron simultaneously with regeneration of the leaching agent while the treatment of the lixiviant with oxygen may be carried out in a separate apparatus. It has been found to be particularly desirable to introduce the oxygen-containing gas into the leaching unit during the leaching process. The oxygen-containing gas, which may consist of air, oxygen-enriched air, or pure oxygen, is introduced into the leaching apparatus in a finely divided form, e.g. through gas-dispersing outlets. The use of the oxygen-containing gas results in oxidation of ferrous ion to ferric ion in accordance with the following relationship: $Fe^{+2} - 1e^- = Fe^{+3}$.

The optimum ratio of the prereduced mineral, e.g. ilmenite, to the lixiviant can be determined in a simple manner to ensure complete removal of iron from the mineral substance. With the preferred ferric-salt-containing leaching agents with 15 to 65 grams of total iron per liter, the ratio lies between 1:3 and 1:8, preferably between 1:4 and 1:7. The optimum pH of the leaching agent ranges between 2.5 and 4.5.

The formation of a pure oxidic or hydroxidic iron compound which is highly filterable and therefore can be separated with ease from the lixiviant is promoted by the addition of a small quantity of ammonium salts. The optimum temperature for the treatment of the lixiviant with oxygen-containing gases lies between 45° and 75° C.

When oxygen-containing gases are supplied during the leaching step to simultaneously remove the elemental iron from the mineral and precipitate the oxidic and/or hydroxidic iron compound while regenerating the leaching agent, we prefer to introduce the mixture of residual heavy-metal oxide, precipitated iron compound and leaching agent to a preliminary separator in which the heavy-metal oxide having a higher specific gravity is separated from the iron hydroxide and the leaching agent, e.g. by sedimentation. The iron hydroxide and leaching agent, which together make up the major portion of the effluent, are recovered as a slurry from the preliminary separator and may be introduced into a thickener in which water is removed and the iron hydroxide is concentrated. When, however, leaching and regeneration are to be carried out in separate devices, the iron compound precipitated from the leaching agent is caused to settle, e.g. in a thickener, and is drawn off through an outlet at the bottom.

The recovered heavy metal oxide, e.g. titanium dioxide, may be used as such (for example as a pigment) or may be subjected to further purification by conventional processes. For example, the titanium dioxide may be converted to the titanium tetrachloride and then transformed into the high-purity oxide or into titanium metal. The iron hydroxide slurry may be subjected, after thickening, to filtration, the precipitate being washed with the filtrate and washing liquors returned to the leaching unit. The iron hydroxide is agglomerated, preferably by pelletization or briquetting in the presence of a binder of the type described earlier. The agglomerates are then dried to increase their strength and, preferably, to convert all of the iron hydroxide to iron oxide. The agglomerates are then recycled to the reducing unit where the iron oxide formed from the iron hydroxide is reduced to sponge iron in conjunction with the selective reduction of oxidic iron from the starting mineral. In this treatment, the agglomerated form of the precipitated iron compound is virtually preserved.

When the starting material is subjected to a preliminary oxidizing step, we have found it to be desirable to feed the oxidizing kiln with both the mineral and the agglomerate containing iron oxide or iron hydroxide. In this case, the oxidizing stage provides a temperature of sufficient degree to mechanically strengthen and "fire" the agglomerate, thereby reducing abrasion losses which may be suffered by the agglomerates as they travel through the reducing kiln.

Because the starting materials (minerals such as ilmenite) charged into the process are finely divided and the agglomerate bodies are of a much larger size, the selectively reduced starting materials can be separated in a simple manner from the agglomerated sponge iron. To this end, we prefer to use screening, e.g. with a vibrating screen.

The rate of reduction of the agglomerated iron oxide, treated in accordance with the present invention, is found to be so high that with a reduction duration selected to ensure complete transformation of oxidic iron to elemental iron in a mineral matter, the pellets or briquettes will also be substantially completely reduced. In other words, the length of the reduction duration selected to ensure complete reduction of the oxidic iron of the starting mineral is sufficient to cause full or substantially complete reduction of the briquettes or pellets consisting almost entirely of iron oxide. We prefer to provide a ratio, in the reduction stage, of agglomerated iron hydroxide (recycled iron oxide) to the starting mineral of substantially 1:3 to 1:4, whereby the additional load imposed upon the reduction kiln or the oxidation-and-reduction kiln is so small that the size of the kiln need not be increased at all or increased appreciably. Hence, we are able to obtain a high-purity sponge iron in agglomerated form with a minimum of equipment expenditure and to render the entire process of treating such ores more economical.

DESCRIPTION OF THE DRAWING

The above and other objects, features and advantages of the present invention will become more readily apparent from the following description and specific examples, reference being made to the accompanying drawing, the sole figure of which is a flow diagram illustrating the invention.

SPECIFIC DESCRIPTION

In the drawing, we show a rotary kiln 1 into which the raw mineral, e.g. ilmenite is fed at 1a together with iron oxide pellets or briquettes which are supplied via line 13 as will be apparent hereinafter. Heated oxygen-containing gases are introduced into the kiln as represented at 1b and may be air, oxygen-enriched air or pure oxygen. Exhaust gas emerges at 1c.

The artificially-weathered product is introduced at 1d into a rotary film 2 forming the reduction stage in which the artificially-weathered mineral and agglomerated iron oxide is treated with reducing gases, e.g. a mixture rich in carbon monoxide and hydrogen as introduced and represented by arrow 2a. The exhaust gases, rich in water vapor and carbon dioxide are recovered at 2b and may be subjected to the usual purification treatment. In kiln 2, the oxidic iron content of the mineral is transformed into metallic iron while the agglomerated iron oxide is converted into pellets or briquettes of sponge iron. The reduction product is discharged through a cooler 3 onto a screening device 4 operating with a vibrating screen. The large particles consist of the metallized (sponge iron) pellets or briquettes which are led at 5 to a storage bin. The metallized fines are recovered at 4a and are subjected to magnetic separation at 4b to separate the iron particles 7 from the carbon particles 6.

With the rotary kiln 2 shown in the drawing, we may add solid carbon (arrow 2c) to serve as the reducing medium. Preferably, when the rotary kiln is employed, a solid reducing agent is used whereas gaseous reduction is carried out in a shaft furnace.

A further magnetic separator 4c is provided to separate the mineral matter 9, consisting of reduced ilmenite, from nonmagnetic constituents, e.g. carbon. The carbon recovered at 6 or 8 may be recycled to the reducing stage as represented by dot-dash line 2d.

The mineral matter, containing selectively reduced iron, is treated at 10 with a leaching agent or lixiviant which is introduced at 10a and the heavy-metal oxide is recovered at 10b preferably in the form of titanium dioxide. The slurry, consisting of lixiviant and precipitated iron hydroxide produced by injecting an oxygen-containing gas at 10b' during leaching, is thickened at 11 with leaching agent being recovered at 11a and being recycled to the leaching stage 10. A further oxygen treatment may be carried out at 11b. The iron hydroxide is pelletized at 12 together with spong-iron fines obtained at 7 and the iron-containing pellets are fed to the rotary kiln 1. The rotary kiln 1 may constitute a dry stage or a further drying may be provided as represented at 13a. A binder may be added at the agglomeration point.

EXAMPLE I

Raw ilmenite at a rate of 8.55 kilograms per hours is subjected to a known oxidizing treatment in a rotary kiln 1 to effect an artificial weathering and is subsequently subjected to a reducing treatment with solid carbon in another rotary kiln 2 to metallize the iron content. The product is discharged through a cooler 3.

A pellet charge travels through the rotary kilns 1 and 2 together with the raw ilmenite. As will be explained hereinafter, this pellet charge is produced by leaching, regenerating, filtering and pelletizing steps and is charged through conduit 13. The pellet charge is discharged through the cooler 3 together with the selectively reduced ilmenite. A screening device 4 is used to separate the sponge iron pellets, produced from the oxidic or hydroxidic iron compound, on the one hand, and fine-grained reduced ilmenite, fines abraded from the pellets, unconsumed carbon and other non-magnetic constituents, on the other hand. The separated sponge iron pellets are fed into a bin 5. The screenings are separated, e.g., by magnetic separation, into unconsumed carbon 6, which can be recycled to the process, fine-grained sponge iron 7, nonmagnetic constituents 8 and reduced ilmenite 9.

Reduced ilmenite is obtained at a rate of 6 kilograms per hour and has a particle size below 0.8 millimeter and the following composition:

| | | |
|---|---|---|
| Total iron | 25.4% | calculated as Fe. |
| Metallic iron | 23.8% | |
| Titanium | 72.1% | calculated at $TiO_2$. |

The reduced ilmenite is leached in a continuously operating leaching unit 10 with iron chloride-containing leaching agent supplied at a rate of 30 liters per hour. The leaching agent contains:

| | Grams per liter |
|---|---|
| $Fe^{3+}$ | 1.5 |
| $Fe^{2+}$ | 62.5 | and has been adjusted to a pH-value of 2.5 to 3.5 by an addition of hydrochloride acid or ammonia solution. During the leaching, finely divided air at a total rate of 42 standard cubic meters is supplied to ensure a thorough mixing of the leaching agent and solids. Leaching is carried out at a temperature of 70° C.

The mixture of solids and solution obtained after leaching and aeration for seven hours is separated into titanium-containing material having a higher specific gravity and an iron hydroxide slurry.

The impurities which still adhere to the titanium-containing material consist mainly of iron hydroxide and iron chloride solution and may be removed by washing. Adhering liquid is then removed from the titanium-containing material, whereafter the latter is dried. The resulting titanium-containing material is obtained at a rate of 4.6 kilograms per hour and contains

| | Percent |
|---|---|
| $TiO_2$ | 93.0 |
| Total iron | 3.5 | in combined form.

The slurry which has formed an overflow fraction in the preliminary separator and consists mainly of iron hydroxide and, if desired, the effluent obtained by washing the titanium dioxide, are jointly fed to a thickener, where an overflow fraction is obtained at a rate of about 30 liters per hour. This fraction is composed of:

| | Grams per liter |
|---|---|
| $Fe^{3+}$ | 3.4 |
| $Fe^{2+}$ | 56.0 | and is continuously recycled to the leaching unit.

The bottom fraction obtained in the thickener consists mainly of iron hydroxide and is washed in 11, then dried and in a suitable unit 12 is agglomerated with the aid of water to form pellets which are 8–12 millimeters in diameter.

The green pellets which are thus produced at a rate of 3.7 kilograms per hour and which contain 32% water are recycled through conduit 13 to the stage in which the ilmenite is oxidized and reduced. In view of the rate of 8.55 kilograms per hour at which raw ilmenite is charged, the ratio of pellets (calculated as dry $Fe(OH)_3$ to raw ilmenite is 1:3.5.

When the charge has travelled through the treating zone 1 and 2 and the coolong zone 3, pellets and fines are separated at 4 by means of a double screen into fractions above 6 millimeters, 1–6 millimeters, and below 1 millimeter. The various products are obtained at the following rates in kilograms per hour:

| | |
|---|---|
| Selectively reduced ilmenite | 6 |
| Sponge iron pellets containing 97.3% total iron and 95% metallic iron | 1.23 |
| Fine-grained sponge iron | 0.12 |
| Nonmagnetic constituents | 0.15 |
| Recycled carbon | 0.3 |

EXAMPLE II

The process of Example I results in the formation of valuable sponge iron pellets, reduced ilmenite to be processed in the leaching stage, and, as an end product, fine-grained sponge iron, which can be handled only with difficulty.

To enable a recovery of sponge iron only in pellet form, the fine-grained sponge iron obtained at 7 is pelletized in this example at 12 together with the oxidic or hydroxidic iron compound and recycled through 13 into the process. Whereas this measure slightly increases the load of the kiln by about 0.12 kilogram per hour or about 1% of the total load, it results in the advantage that in a process which is otherwise the same as in Example I the rate at which sponge iron pellets are produced is increased by 0.12 kilogram per hour and the formation of fine-grained sponge iron, which is less desirable, is avoided.

We claim:
1. A method of processing a mineral containing FeO, comprising the steps of:
   (a) reducing iron oxides in said mineral to metallic iron;
   (b) leaching the metallic iron produced in step (a) from said mineral with a lixiviant capable of solubilizing elemental iron;
   (c) precipitating from the lixiviant of step (b) oxidic and/or hydroxidic iron compounds;
   (d) agglomerating the precipitated oxidic and/or hydroxidic iron compounds precipitated in step (c); and
   (e) recycling the agglomerate of step (d) to step (a) for reduction of the agglomerate simultaneously with the reduction of iron oxides of said mineral to produce sponge iron from the agglomerate.

2. The method defined in claim 1 wherein said mineral is an ore containing a heavy-metal oxide in addition to FeO, said method further comprising the steps of:
   (f) recovering from step (b), upon leaching of the metallic iron from said mineral, the heavy-metal oxide in a high-purity form; and
   (g) regenerating the lixiviant by treating the same with an oxygen-containing gas, thereby enabling the lixiviant to be used to leach further metallic iron from said mineral in step (b).

3. The method defined in claim 2, further comprising the step of:
   (h) separating the sponge iron of the agglomerate from the mineral in which iron oxides are reduced in step (a) prior to leaching said mineral in step (b) with said lixiviant.

4. The method defined in claim 3 wherein the heavy-metal oxide is titanium dioxide.

5. The method defined in claim 4 wherein said mineral is ilmenite.

6. The method defined in claim 3, further comprising the step of:
   (i) drying the agglomerate produced in step (d) prior to recycling it to step (a).

7. The method defined in claim 6 wherein the drying of the agglomerate in step (i) is carried out at a temperature and for a duration sufficient to convert any hydroxidic iron compound in said agglomerate to iron oxide.

8. The method defined in claim 6, further comprising the step of:
   (j) recovering from step (a) finely divided sponge iron and incorporating it in the agglomerate produced in step (d).

9. The method defined in claim 3, further comprising the step (i) of weathering the mineral artificially in an oxygen-containing atmosphere prior to reduction of the iron oxides in said mineral in step (a).

10. The method defined in claim 9 wherein the mineral is fired in step (i) in an oxygen-containing atmosphere and said agglomerate is recycled in step (e) to step (a) by combining it with the mineral fired in step (i).

11. The method defined in claim 3 wherein the iron oxides in said mineral and the agglomerate are reduced in step (a) in the presence of solid carbon in a rotary kiln.

12. The method defined in claim 3 wherein the iron oxides of said mineral and said agglomerate are reduced in step (a) in a shaft furnace in the presence of a reducing gas.

13. The method defined in claim 3 wherein said lixiviant is a solution containing a ferric salt.

14. The method defined in claim 13 wherein said lixiviant, prior to leaching in step (b), contains divalent and trivalent iron in a ratio between 30:0.5 and 30:3 and contains 15 to 65 g./liter total iron.

15. The method defined in claim 14 wherein said mineral is ilmenite and said iron oxides are reduced in step (a) at a temperature of 700 to 1300° C. for a period of 20 to 140 minutes.

16. The method defined in claim 15 wherein said mineral is treated with an oxygen-containing gas at a temperature of 750° C. to 1250° C. for a period of 20 to 150 minutes prior to reduction in step (a).

17. The method defined in claim 16 wherein the leaching of step (b) and the precipitation of step (c) are carried out simultaneously with regeneration of the lixiviant by injecting an oxygen-containing gas into a lixiviant during the leaching of the metallic iron in step (b).

References Cited

UNITED STATES PATENTS

| | | | |
|---|---|---|---|
| 2,912,320 | 11/1959 | Chang | 75—34 |
| 2,026,683 | 1/1936 | Johannsen | 75—36 |
| 2,238,673 | 4/1941 | Asak | 75—21 X |
| 921,686 | 5/1909 | Fitzgerald et al. | 75—31 X |
| 1,734,034 | 11/1929 | Gregory | 75—33 X |
| 1,542,350 | 6/1925 | Whittemore | 75—31 |
| 1,699,173 | 1/1929 | Whittemore | 75—31 X |
| 3,291,599 | 12/1966 | Reeves | 75—34 UX |
| 3,469,970 | 9/1969 | Heitmann | 75—33 |
| 2,778,724 | 1/1957 | Moklebost | 75—31 X |
| 2,811,434 | 10/1957 | Moklebost | 75—31 X |

HENRY W. TARRING II, Primary Examiner

U.S. Cl. X.R.

75—21, 31, 34, 104, 121; 23—202